(12) United States Patent
Slodki et al.

(10) Patent No.: US 8,818,897 B1
(45) Date of Patent: Aug. 26, 2014

(54) SYSTEM AND METHOD FOR VALIDATION AND ENFORCEMENT OF APPLICATION SECURITY

(75) Inventors: Zenon Slodki, Nepean (CA); Xiaoding Zhao, Nepean (CA); Cliff Wichmann, Nepean (CA)

(73) Assignee: Rockstar Consortium US LP, Plano, TX (US)

( * ) Notice: Subject to any disclaimer, the term of this patent is extended or adjusted under 35 U.S.C. 154(b) by 1639 days.

(21) Appl. No.: 11/304,043

(22) Filed: Dec. 15, 2005

(51) Int. Cl.
  *G06F 21/00* (2013.01)
  *G06F 21/12* (2013.01)

(52) U.S. Cl.
  CPC .................................. *G06F 21/121* (2013.01)
  USPC .................... 705/51; 726/17; 726/18; 726/21

(58) Field of Classification Search
  USPC .............................. 726/17–21, 22–30; 705/51
  See application file for complete search history.

(56) References Cited

U.S. PATENT DOCUMENTS

| | | | | |
|---|---|---|---|---|
| 5,406,624 A * | 4/1995 | Tulpan | ............................ | 713/192 |
| 5,421,006 A * | 5/1995 | Jablon et al. | ...................... | 714/36 |
| 5,590,199 A * | 12/1996 | Krajewski et al. | ............. | 713/159 |
| 5,724,425 A * | 3/1998 | Chang et al. | ...................... | 705/52 |
| 5,742,759 A * | 4/1998 | Nessett et al. | ...................... | 726/4 |
| 5,757,925 A * | 5/1998 | Faybishenko | .................. | 709/203 |
| 5,832,209 A * | 11/1998 | Krantz | ............................... | 726/4 |
| 5,933,826 A * | 8/1999 | Ferguson | ............................ | 707/9 |
| 5,944,821 A * | 8/1999 | Angelo | ............................ | 726/22 |
| 6,078,909 A * | 6/2000 | Knutson | .......................... | 705/59 |
| 6,094,679 A * | 7/2000 | Teng et al. | ...................... | 709/220 |
| 6,105,137 A * | 8/2000 | Graunke et al. | .................. | 726/24 |
| 6,161,181 A * | 12/2000 | Haynes et al. | ................. | 713/170 |
| 6,226,618 B1 * | 5/2001 | Downs et al. | ...................... | 705/1 |
| 6,226,752 B1 * | 5/2001 | Gupta et al. | ...................... | 726/9 |
| 6,694,434 B1 * | 2/2004 | McGee et al. | ................. | 713/189 |
| 6,697,948 B1 * | 2/2004 | Rabin et al. | ...................... | 726/30 |
| 6,748,537 B2 * | 6/2004 | Hughes | .......................... | 713/193 |
| 6,782,477 B2 * | 8/2004 | McCarroll | ...................... | 713/189 |
| 7,003,672 B2 * | 2/2006 | Angelo et al. | ................. | 713/189 |
| 7,571,472 B2 * | 8/2009 | Royer | .............................. | 726/19 |
| 7,865,931 B1 * | 1/2011 | Stone et al. | ....................... | 726/1 |
| 8,171,287 B2 * | 5/2012 | Villela | .......................... | 713/168 |
| 2003/0163684 A1 * | 8/2003 | Fransdonk | .................... | 713/153 |
| 2004/0111618 A1 * | 6/2004 | Vaha-Sipila | .................. | 713/176 |
| 2004/0143746 A1 * | 7/2004 | Ligeti et al. | ...................... | 713/185 |
| 2005/0160414 A1 * | 7/2005 | Parnanen et al. | ............. | 717/148 |
| 2005/0182958 A1 * | 8/2005 | Pham et al. | ..................... | 713/200 |

OTHER PUBLICATIONS

Ron White, "How Computers Work", 7$^{th}$ Edition by Que, Oct. 2003.*

* cited by examiner

*Primary Examiner* — Steven Kim

(57) ABSTRACT

A system and method for validation and enforcement of application security, wherein the user credentials and the integrity of a target application are verified before the target application is permitted to execute.

20 Claims, 3 Drawing Sheets

SYSTEM AND METHOD FOR VALIDATION AND ENFORCEMENT OF APPLICATION SECURITY

TECHNICAL FIELD OF THE INVENTION

The present invention is directed, in general, to computer system hardware and software security.

BACKGROUND OF THE INVENTION

To any sophisticated user, the security of computer system hardware and software is important. Threats include both unauthorized use of systems and software, and, for software, the danger that the software application itself can be altered, hacked, or otherwise compromised.

These issues are also important to enterprises and employers, which must maintain the integrity of their systems, software, and data. Application software providers also have great interest in maintaining the integrity of their products, particularly when ongoing services are provided from a server system.

Typically, software applications are directly downloaded from the provider or a third party. In most cases, there is no means to verify the integrity of the initial download, much less to detect any alteration after installation.

Another significant security risk is present when a user of an application on a client data processing system accesses online data or services of a service provider. In this case, there is commonly some sort of user verification locally or on the server system, but not both, and where the local application can be compromised, the user verification may also be compromised.

There is, therefore, a need in the art for a system, process, and computer program product for validation and enforcement of software application security.

SUMMARY OF THE INVENTION

To address the above-discussed deficiencies of the prior art, the disclosed embodiments include a system and method for validation and enforcement of application security, wherein the user credentials and the integrity of a target application can be verified before the target application is permitted to execute.

In accordance with one embodiment of the present invention, there is provided a method for data processing system application security, comprising receiving a request to execute a target application; generating an application signature of the target application; comparing the generated application signature to a known application signature; and preventing the execution of the target application when the generated application signature does not correspond to the known application signature. Another embodiment also includes receiving user credentials; encrypting the user credentials; transmitting an authentication message to a server system, wherein the authentication message includes the encrypted user credentials and an application identifier corresponding to the target application; receiving an authorization response from the sever system; and preventing the execution of the target application when the authorization response does not indicate a valid authorization.

In accordance with another embodiment of the present invention, there is provided a computer program product tangibly embodied in a machine-readable medium, comprising instructions for receiving a request to execute a target application; instructions for generating an application signature of the target application; instructions for comparing the generated application signature to a known application signature, the known application signature corresponding to a valid target application; instructions for preventing the execution of the target application if the generated application signature does not correspond to the known application signature.

In accordance with another embodiment of the present invention, there is provided a data processing system having at least a processor and accessible memory, comprising means for receiving a request to execute a target application means for generating an application signature of the target application; means for comparing the generated application signature to a known application signature, the known application signature corresponding to a valid target application; means for preventing the execution of the target application if the generated application signature does not correspond to the known application signature.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
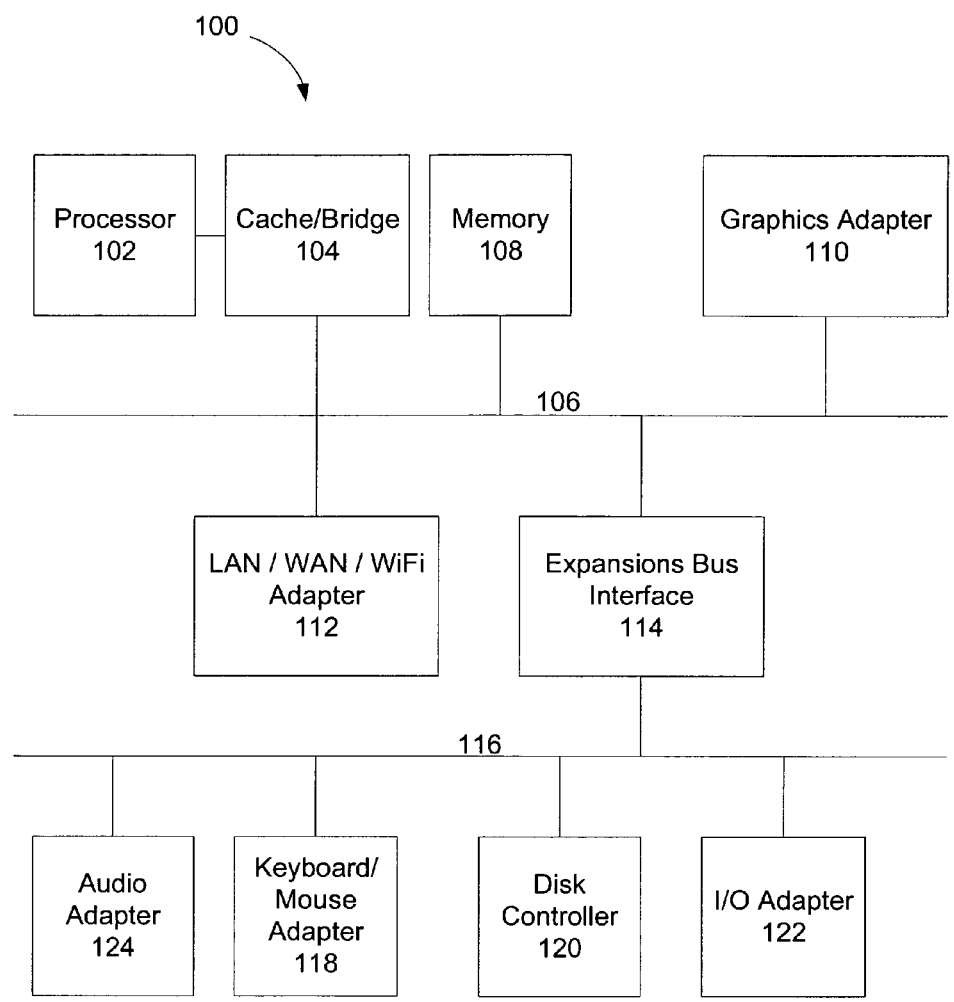
FIG. 1 depicts a block diagram of a data processing system in which one embodiment can be implemented.
Figure 2:
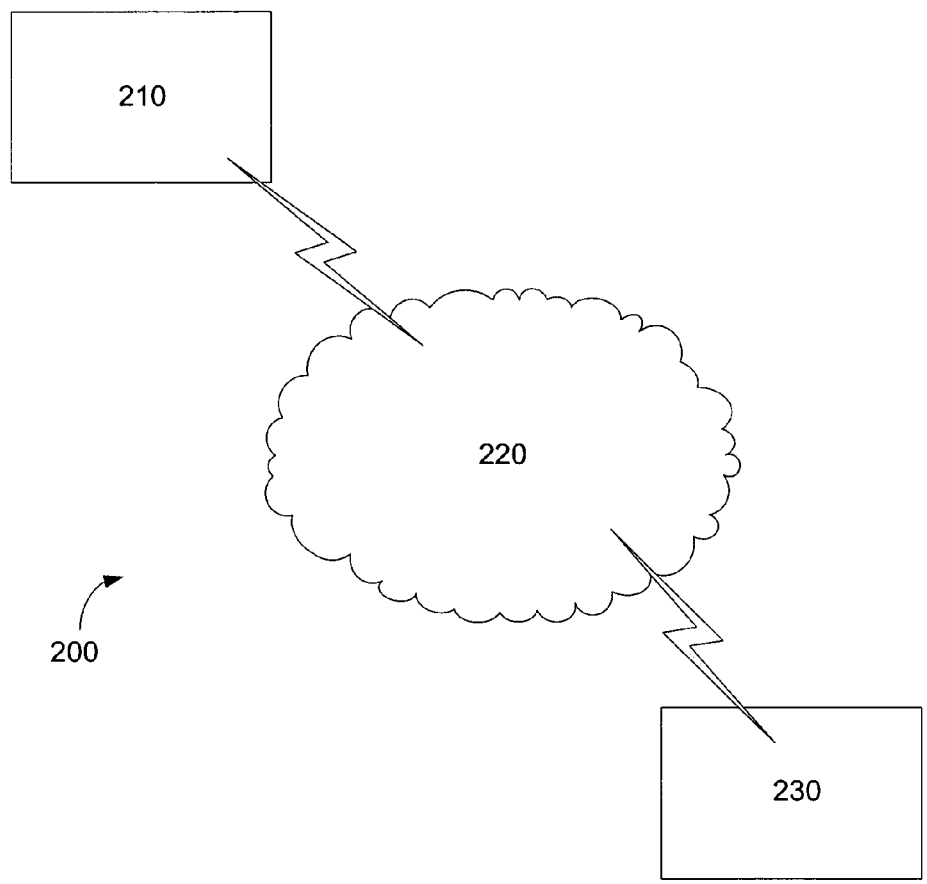
FIG. 2 depicts a simplified block diagram of a data processing system network in which one embodiment of the present invention can be implemented.
Figure 3:
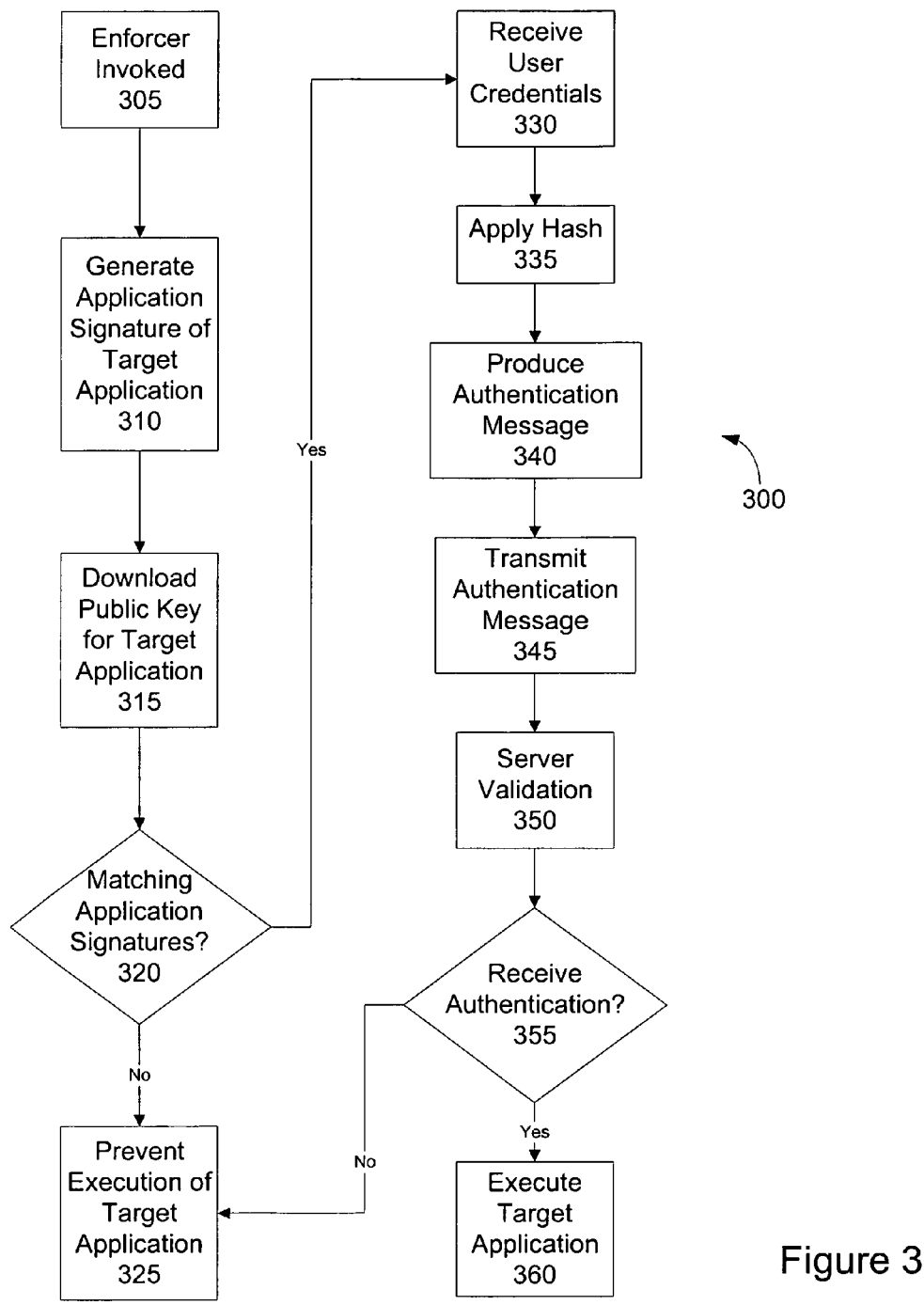
FIG. 3 depicts a flowchart of a process in accordance with an embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device. The numerous innovative teachings of the present application will be described with particular reference to the presently preferred embodiment.

Various embodiments include a system and method for the validation and enforcement of computer system and software security, preferably using dual authentications. Preferably, an "enforcer" application is used to validate the integrity of another software application before execution, and can also be used to verify the credentials of the user of the application. In various embodiments, the enforcer application can validate the integrity and authenticity of another software application both when the other software application is downloaded and whenever it is executed. Further, the enforcer application can collect and transfer user security credentials from a client data processing system, where another application is to be executed, to a server system. The verification of both the other software application and the user security credentials can be accomplished before the other application is allowed to execute or perform specific tasks.

For consistent reference, a software application that performs functions as described and/or claimed herein will be referred to hereafter as the "enforcer application," and a software application that is the object of an enforcer application will be referred to as the "target application." These terms are solely for ease of reference herein, and do not imply any limitation not specifically described.

As known to those of skill in the art, a public key infrastructure (PKI) is a common term for a system that enables users of a network, public or private, to exchange data securely and privately through the use of a public and private cryptographic key pair that is obtained and shared through a trusted authority. PKI provides for a digital certificate that can identify an individual or an organization and director services that can store and, when necessary, revoke the certificates. The comprehensive architecture includes key management, the registration authority, certificate authority, and various administrative tool sets.

A "private key" generally refers to the private part of a two-part, dual-key asymmetric cryptography system. Preferably, the private key is provided by a certificate authority, kept secret and never transmitted to other parties. A "public key" generally refers to the public part of the dual-key asymmetric cryptography system. The public key is often publicly available from keyservers.

In general, data that is encrypted with one of the keys of a dual-key pair can only be decrypted by the other key. In typical use for encryption, data is encrypted using a public key, and then can only be decrypted by the recipient's private key.

Similarly, each key can be used to "sign" data to identify the recipient. Obviously, it is of slight utility to sign data using a public key, since this key may be available to any number of people. In contrast, if data is signed by a user's (or enterprise's) private key, then the signature can be verified by anyone with the public key as having been signed by that specific private key.

In various embodiments discussed in more detail below, PKI techniques are preferably used to both encrypt and sign digital data.

Various embodiments can be implemented in common hardware contexts, such as a typical data processing system and network, as well as in customized or custom-built systems, as will be recognized by those of skill in the art. FIGS. 1 and 2 present a typical data processing system and network, respectively, in which a system and method in accordance with the disclosed embodiments can be implemented. Following that description is a more detailed discussion of the functions and operations of the preferred embodiments.

FIG. 1 depicts a block diagram of a data processing system 100 in which one embodiment of the present invention can be implemented. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus 106 in the depicted example are a main memory 108 and a graphics adapter 110.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122.

Also connected to I/O bus 116 in the example shown is audio adapter 124, to which speakers (not shown) may be connected for playing sounds. Keyboard/mouse adapter 118 provides a connection for a keyboard and/or pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not intended to imply architectural limitations with respect to the present invention.

A data processing system 100 in accordance with one embodiment of the present invention includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the keyboard or pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present invention as described.

FIG. 2 depicts a simplified block diagram of a data processing system network 200 in which one embodiment of the present invention may be implemented. Here, a client data processing system 210 is connected to communicate with a network 220, which can be a private network such as one used by a business enterprise, or can be a public network such as the internet. Network 220 can be implemented as any standard or conventional network, and is in one embodiment is an internet protocol (IP) based network.

Also connected to network 220 is a server data processing system 230. In this simplified diagram, client data processing system 210 and/or server data processing system 230 can be implemented as a typical system such as data processing system 100, above. This simplified diagram illustrates that client data processing system 210 can communicate, as described herein, with server data processing system 230 over network 220, using any appropriate communication protocols. Such communication can be wired, wireless, over broadband or dialup systems, or using any other conventional technique.

As described above, in various embodiments, an enforcer application, running on a client data processing system 210, validates integrity and authenticity of a target software application both when the target software application is downloaded and prior to execution. Further, the enforcer application can collect and transfer user security credentials from the client data processing system 210, where the target application is to be executed, to a server data processing system 230. Verification of both the target software application and the user security credentials can be accomplished before the target application is allowed to execute or perform specific tasks. In this way, the disclosed system protects the server data processing system 230 by validating the target software application through a digital signature before allowing a server connection. The server data processing system 230 is therefore protected from any altered or illegitimate client application level security attacks. Further, this validation mechanism also automatically and seamlessly protects the end user from unwittingly running an altered or illegitimate target application, and ensures that the target application is virus free.

In preferred embodiments, it is assumed that a server data processing system 230 controls the private key of a dual-key encryption system. As known to those of skill in the art, the private key can decrypt anything encrypted with the corresponding public key of a dual-key pair, and the private key can be used to digitally "sign" data, allowing the signature to be verified using the corresponding public key. The public and private keys are typically stored in certificate files. Of course, this assumes that both ends of the transactions use compatible encryption/decryption software or algorithms. Suitable software and algorithms are well known to those of skill in the art.

In various embodiments, each target software application is associated with a public key of a dual-key pair and is digitally signed by the manufacturer or distributor. Each public key corresponds to a private key controlled by a server system. In one embodiment, before or when the target application is downloaded or installed, the public key for the target application is used to decrypt the digital signature to verify that it actually came from the appropriate manufacturer or distributor.

Note that, as used herein, "download" and its variants are generally used to refer to transferring data from a server data processing system 230 to a client data processing system 210, while "upload" and its variants are generally used to refer to transferring data from a client data processing system 210 to a server data processing system 230.

In a preferred embodiment, each target application also includes an application signature that can be derived from an valid, installed, unaltered version of the target application. This application signature is preferably signed or encoded using the private key, and can be decoded and verified using the public key, and is stored on the client data processing system 210. The application signature can be generated in any known way, from something as simple as a "checksum", whereby the individual binary values of a string of storage locations corresponding to the target application are totaled, or a hash such as a Secure Hashing Algorithm (SHA-1) hash, to more sophisticated ways including examining the bit contents of certain portions of the storage locations of the application, to a combination of these. An important aspect of the application signature, in one implementation, is that it is only reproduced by analyzing a properly installed, unaltered version of the target application.

As described herein, it is assumed that the server data processing system 230 has a verified server copy of the application signature, preferably obtained from the target application manufacturer or distributor.

By generating an application signature of the installed target application and comparing it to the known application signature for that target application, the enforcer application can determine if the target application has been altered in any way. For this reason, in one embodiment, any user data of the target application is typically not included in generating the application signature.

FIG. 3 depicts a flowchart of a process 300 in accordance with an embodiment of the present invention, and is used to illustrate some steps described below. Various implementations include a computer program product with instructions for carrying out steps as disclosed herein, and a data processing system with suitable means for carrying out steps as described herein, as will be understood by those of skill in the art.

In one embodiment, when a user wants to run a target application on a client data processing system 210, the user first invokes the enforcer application (step 305). In various embodiments, the user can either do this directly, or the client data processing system 210 can automatically invoke the enforcer application when the user requests the target application. The enforcer application, upon receipt of the request to invoke the target application, generates and stores the application signature of the installed target application (step 310).

The enforcer application can optionally download the public key corresponding to the target application (step 315) from the server data processing system 230 corresponding to that target application. Note that in other embodiments, the public key has already been downloaded and stored, as described above, so in these implementations, it may not be necessary to download it again.

This application signature is compared against the stored application signature for that target application (step 320), which is decrypted if necessary. In some embodiments, instead of using a stored application signature for the target application, a verified server copy of the application signature can be downloaded from the server data processing system 230.

Note that, here, while it is possible to use a previously-generated application signature, it is preferred that the application signature be re-generated on each use, so that any alteration to the target application is immediately apparent.

If the application signature does not match the stored application signature, the enforcer application determines that the installed target application is illegitimate or otherwise corrupt. In this case, the enforcer application will preferably prevent execution of the target application (step 325). Optionally, the enforcer application can also report the authentication failure to a network administrator, the software distributor, or another party. Of course, the enforcer application could also take other actions, such as deleting or disabling the target application. In other embodiments, the enforcer application manages a process to re-download and re-install the target application, if desired.

If the application signature does matches the stored application signature, then the first stage of the authentication is complete.

The enforcer application will receive user credentials for the target application, which may include a userid and password or other credentials as known to those of skill in the art (step 330). Preferably, the enforcer application applies an SHA-1 hash of the credentials (step 335). The enforcer application combines the credentials with an application identifier and the previously-generated application signature to produce an authentication message (step 340), and sends this information to the server data processing system 230 (step 345). Preferably, the authentication message is encrypted using the public key, so that only the server system having the private key can decrypt it.

The server data processing system 230 decrypts the received authentication message and compares the application signature to the verified server copy of the application signature, thereby performing a second validation of the installed target application. The server data processing system 230 also decodes and verifies the user credentials. In this way, the server data processing system 230 validates both the target application and the user credentials (step 350). If both are validated, the server data processing system 230 returns an authorization response to the enforcer application on the client data processing system 210. Preferably, this authorization response is signed using the server's private key.

The enforcer application then receives the authorization response from the server data processing system 230 (step 355), and performs any necessary validation or decryption. At this point, if the authorization response indicates a valid authorization from the server data processing system 230, the target application is permitted to execute (step 360), and control of that application is typically returned to the user. Here, the second stage of the authentication is complete.

In some embodiments, the user credentials are received by the target application.

Of course, if the authorization response does not indicate a valid authorization, or if the authorization response is not received from the server data processing system 230, the enforcer application will preferably prevent execution of the target application (step 325).

In other embodiments, if the authorization fails at this point, the target application is permitted to execute but not to communicate with the server data processing system 230, or other systems, or to perform other specific tasks.

Note that the second stage of authentication, in alternate embodiments, can be performed by the target application itself instead of by the enforcer application. In this way, once the enforcer application has verified the integrity of the target application, the target application performs its own user authentication. In this case, in some implementations, the enforcer application acts as a proxy and the target application can continue to use the same network socket connection with the server data processing system 230 that the enforcer application used for the application validation.

Those of skill in the art will also appreciate that, in various embodiments, some of the steps described above can be omitted, and not all steps must be performed in the particular order described above.

A dual authentication such as that described herein improves on known methods that are insufficient to protect the security of both the customer and the target application. The disclosed embodiments enable the user, through the enforcer application, to independently validate the integrity and authenticity of the target application both upon download and before permitting execution of some or all functions of the target application. The disclosed embodiments also securely collect and transfer user security credentials from the client data processing system 210 to the server data processing system 230, so that both factors of software authenticity and user authenticity can be verified on the server side before permitting execution of the target application, connection by the target application to the server, or both.

According to various embodiments, the target application is created with an accompanying digital application signature stored in a certificate file, and encrypted or signed using a private key of a dual-key pair. The application signature preferably corresponds to one that can be derived from a valid, unaltered version of the target application as installed on a client data processing system 210.

In embodiments where the target application is downloaded from a server, the application signature is downloaded at the same time, and preferably the application download itself is signed by the server.

In some embodiments, multiple target applications are installed on client data processing system 210 as described herein, and the enforcer application can validate and control access to each of them as described herein. A different server data processing system 230 can be used for each target application, or a single server data processing system 230 can be used for multiple different target applications. In other embodiments, only specific functions or modules of an application are protected using the techniques described herein, and the validation processes are only employed when a user seeks to execute those functions or modules.

In such embodiments that include multiple target applications, each target application can be associated with its own digital certificate. In various embodiments, each target application can then use its digital certificate in encrypting the target application communication following the target application launch. The digital certificate can then be used to provide application message authentication.

In alternate embodiments, a separate server system is not used. Instead, the functions described above as performed by a server are performed by an authentication process running on the client data processing system 210 itself, which keeps the private key, application signature, and other elements in a secure and preferably encrypted storage on the client data processing system 210. In this way, many of the advantages of the preferred embodiments can be achieved even without a server system, or when communication to the server system is unavailable.

In other embodiments, the enforcer application can act as a general download manager, to validate any software before, during, and after a download, using application signature and server signature techniques as described above.

In some implementations, the enforcer application is implemented as a JAVA applet that can be downloaded for execution from the server data processing system 230 itself. In some embodiments, where the enforcer application itself is not automatically downloaded from the server, the enforcer application can validate its own integrity using techniques as described herein. For example, the enforcer application can also generate an application signature for itself for validation by the server system.

In some preferred implementations, the server system is a Business Communications Manager (BCM) server system by Nortel Networks®. In other embodiments, the server system can be a Radius or LDAP server or other server. Further, the server system as described herein can be implemented with more than one actual data processing system. For example, one server data processing system can act as a repository for application signatures, and another server data processing system can perform validation tasks.

In alternate embodiments, a process according to that performed by the enforcer application can be performed as part of a startup or user login process to a data processing system, where the operating system or other application is the target application. In this case, the techniques disclosed herein can be used to limit access to the data processing system hardware until the integrity of the operating system or other system software, and the validity of the user's credentials, are verified.

Another advantageous use of various embodiments is as an anti-virus/anti-hacking solution. Traditional anti-virus software relies on examining files/binaries and then comparing for known virus patterns. By verifying the application signature as described herein, even in a virus infested environment, the target application can be guaranteed to be free of any infection. In this way, any virus modification of the target application is detected before the target application can execute any malicious payload.

In other embodiments, the client data processing system can also authenticate the server data processing system. This can be accomplished, for example, with a certificate exchange using, e.g., OpenSSL/Apache. The client would be able to confirm the server's credentials as defined in the certificate, which would be compared to the information sent in the encrypted socket communication, as will be understood by those of skill in the art. The enforcer application can also compare the address specified in the server connection request with the address in the header of the reply message to validate that the server identity is valid. This feature could be implemented, for example, as a separate step in the process illustrated in FIG. 3, such as before step 320.

In implementations where the target application software and/or signatures are distributed using fixed media such as a CDROM, DVD-ROM, USB, and others, the techniques discussed herein can be used to evaluate the target application and send this to the server for acceptance. The techniques of the various embodiments herein can be used to verify application software no matter how the files or signatures are obtained on the client computer data processing system.

Those of skill in the art will recognize, therefore, that the techniques and functions described herein include a broad scope of authentication methods, including various security processes handled by the enforcer application. These include client data processing system and application integrity, through digital signatures which are validated by server-side authentication; user credentials (e.g., username, password, and certificates for multi-factor authentication); an option for the client to validate the server identity and integrity; and application message integrity using the certificates to ensure that the target application communication with the server is secure.

Those skilled in the art will recognize that, for simplicity and clarity, the full structure and operation of all data processing systems suitable for use with the present invention is not being depicted or described herein. Instead, only so much of a data processing system as is unique to the present invention or necessary for an understanding of the present invention is depicted and described. The remainder of the construction and operation of data processing system 100 may conform to any of the various current implementations and practices known in the art.

It is important to note that while the present invention has been described in the context of a fully functional system, those skilled in the art will appreciate that at least portions of the mechanism of the present invention are capable of being distributed in the form of instructions contained within a machine usable medium in any of a variety of forms, and that the present invention applies equally regardless of the particular type of instruction or signal bearing medium utilized to actually carry out the distribution. Examples of machine usable mediums include: nonvolatile, hard-coded type mediums such as read only memories (ROMs) or erasable, electrically programmable read only memories (EEPROMs), user-recordable type mediums such as floppy disks, hard disk drives and compact disk read only memories (CD-ROMs) or digital versatile disks (DVDs), and transmission type mediums such as digital and analog communication links.

Although an exemplary embodiment of the present invention has been described in detail, those skilled in the art will understand that various changes, substitutions, variations, and improvements of the invention disclosed herein may be made without departing from the spirit and scope of the invention in its broadest form.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC §112 unless the exact words "means for" are followed by a participle.

What is claimed is:

1. A method for data processing system application security, the method comprising:
   receiving, by a client machine, a request to execute an installed first application;
   executing, by the client machine, a second application in response to the request;
   generating, by the second application, a signature for the first application;
   comparing, by the second application, the generated signature with a stored signature;
   based on the comparison:
     receiving, by the second application, user credentials;
     generating, by the second application, an authentication message by combining the user credentials, an application identifier corresponding to the installed first application, and the generated signature; and
     encrypting, by the second application, the authentication message;
   transmitting, by the client machine using the second application, the authentication message to a server;
   receiving, by the second application, an authorization from the server that is based on a validation by the server;
   determining, by the second application, validity of the authorization received from the server; and
   based on the determination, preventing, by the second application, execution of the installed first application.

2. The method of claim 1, wherein:
   the authentication message is decrypted by the server,
   the generated signature and the user credentials are validated by the server, and
   the validation is transmitted by the server to the client machine.

3. The method of claim 1, wherein the stored signature is downloaded from the server and digitally signed by the server.

4. The method of claim 1, wherein the generated signature does not correspond to the stored signature if the first application has been modified.

5. The method of claim 1, wherein the authentication message is encrypted so that the authentication message can only be decrypted using a private cryptographic key stored by the server.

6. The method of claim 1, wherein the authentication message also includes data corresponding to the generated signature.

7. The method of claim 6, wherein the authorization also indicates a validation of the data corresponding to the generated signature.

8. The method of claim 1, wherein:
the second application manages a process to download and re-install the first application on the client data processing system when the generated signature does not correspond to the stored signature, and
the second application disables the first application when the generated signature does not correspond to the stored signature.

9. A non-transitory computer storage medium storing computer executable instructions that, when executed by a computer, causes the computer to perform the steps comprising:
receiving, by the computer, a request to execute an installed first application;
executing, by the computer, a second application in response to the request;
generating, by the second application, a signature for the first application;
comparing, by the second application, the generated signature with a stored signature;
based on the comparison:
receiving, by the second application, user credentials;
generating, by the second application, an authentication message by combining the user credentials, an application identifier corresponding to the installed first application, and the generated signature; and
encrypting, by the second application, the authentication message;
transmitting, by the computer using the second application, the authentication message to a server;
receiving, by the second application, an authorization from the server that is based on a validation by the server;
determining, by the second application, validity of the authorization received from the server; and
based on the determination, preventing, by the second application, execution of the installed first application.

10. The non-transitory computer storage medium of claim 9, wherein:
the authentication message is decrypted by the server,
the generated signature and the user credentials are validated by the server, and
the validation is transmitted by the server to the computer.

11. The non-transitory computer storage medium of claim 9, wherein the generated signature does not correspond to the stored signature if the first application has been modified.

12. The non-transitory computer storage medium of claim 9, wherein the authentication message also includes data corresponding to the generated signature.

13. The non-transitory computer storage medium of claim 12, wherein the authorization also indicates a validation of the data corresponding to the generated application signature.

14. The non-transitory computer storage medium of claim 9, wherein:
the second application manages a process to download and re-install the first application on the computer when the generated signature does not correspond to the stored signature, and
the second application disables the first application when the generated signature does not correspond to the stored signature.

15. A data processing system comprising:
a processor; and
an accessible non-transitory storage medium storing an executable first application and computer executable instructions that, when executed by the processor, causes the processor to perform the operations comprising:
receiving, by the processor, a request to execute the first application;
executing, by the processor, a second application in response to the request;
generating, by the second application, a signature for the first application;
comparing, by the second application, the generated signature with a stored signature;
based on the comparison:
receiving, by the second application, user credentials;
generating, by the second application, an authentication message by combining the user credentials, an application identifier corresponding to the first application, and the generated signature; and
encrypting, by the second application, the authentication message;
transmitting, by the processor using the second application, the authentication message to a server;
receiving, by the second application, an authorization from the server that is based on a validation by the server;
determining, by the second application, validity of the authorization received from the server; and
based on the determination, preventing, by the second application, execution of the first application.

16. The data processing system of claim 15, wherein:
the authentication message is decrypted by the server,
the generated signature and the user credentials are validated by the server, and
the validation is transmitted by the server to the data processing system.

17. The data processing system of claim 15, wherein the generated signature does not correspond to the stored signature if the first application has been modified.

18. The data processing system of claim 15, wherein the authentication message also includes data corresponding to the generated signature.

19. The data processing system of claim 18, wherein the authorization also indicates a validation of the data corresponding to the generated signature.

20. The data processing system of claim 15, wherein:
the second application manages a process to download and re-install the first application when the generated signature does not correspond to the stored signature, and
the second application disables the first application when the generated signature does not correspond to the stored signature.

* * * * *